UnitedStatesPatentOffice 3,557,130
Patented Jan. 19, 1971

3,557,130
METHOD FOR PRODUCING COLORLESS ESTERS OF PYRIDINE CARBOXYLIC ACIDS
Bror Gösta Pettersson, Karlskoga, Sweden, assignor to Aktiebolaget Bofors, Bofors, Sweden, a company of Sweden
No Drawing. Continuation-in-part of application Ser. No. 508,368, Nov. 17, 1965. This application Aug. 6, 1968, Ser. No. 750,491
Claims priority, application Sweden, Nov. 21, 1964, 14,090/64
Int. Cl. C07d *31/36*
U.S. Cl. 260—295.5       3 Claims

ABSTRACT OF THE DISCLOSURE

Colorless esters of pyridine carboxylic acid are obtained by the reaction of an alcohol with the pyridine carboxylic acid chloride. The acid chloride is prepared by the reaction of the free acid with phosphorus oxychloride in solution in a tertiary amine, such as pyridine, and the esterification effected by addition of alcohol to the reaction mixture. The ester is precipitated by the addition of water.

CROSS REFERENCE

This application is a continuation-in-part application based upon my co-pending application Ser. No. 508,368 filed Nov. 17, 1965, now abandoned.

SPECIFICATION

This invention relates to a method of preparing esters of pyridine carboxylic acids and alcohols. It particularly relates to an improved method of preparing such esters, particularly meso-inositol hexanicotinate.

The preparation of an ester of a pyridine carboxylic acid and an alcohol by the reaction of a pyridine carboxylic acid chloride with the desired alcohol in the presence of a free base, preferably a tertiary amine such as pyridine, is known in the art. The usual manner of carrying out this preparation is to convert the pyridine carboxylic acid to pyridine carboxylic acid chloride by the reaction of the free carboxylic acid with thionyl chloride, using an excess of the thionyl chloride to insure complete conversion of the free carboxylic acid to its corresponding carboxylic acid chloride. The carboxylic acid chloride is then converted to the ester by treatment with the desired alcohol. However, before the esterification is carried out, the excess thionyl chloride must be removed from the mixture of the pyridine carboxylic chloride, which is present as its hydrochloride, and unreacted thionyl chloride. This is necessary to prevent any reaction of the alcohol with the thionyl chloride, particularly when the alcohol in a polyol, e.g., meso-inositol, which may lead to the formation of a chlorinated hydroxy compound that in turn may react with the acid chloride thus forming a chlorinated ester which may be difficult to remove from the desired ester.

Furthermore, the presence of unreacted thionyl chloride during the esterification leads to the formation of undesirable color in the ester, which color is difficult to remove, particularly from higher molecular weight esters. However, in actual practice it is practically impossible to remove all of the unreacted thionyl chloride, so that under the best conditions the ester will have some color.

It is, therefore, an object of this invention to provide a method for preparing esters of pyridine carboxylic acids which esters are colorless.

It is a further object of this invention to eliminate the use of thionyl chloride as the chlorinating agent in the preparation of pyridine carboxylic acid chlorides.

Other objects of the invention will be seen from the description which follows.

I have now found that by using phosphorus oxychloride as the chlorinating agent for the preparation of pyridine carboxylic acid chlorides it is possible to obtain esters of pyridine carboxylic acids which esters are substantially colorless. The chlorination is carried out at temperatures of about 60° C., and the esterification at about 80° C. The ester precipitated from the reaction mixture by addition of water.

Other advantages which are derived from the use of phosphorus oxychloride in place of thionyl chloride are:

(1) The reaction between the pyridine carboxylic acid and the phosphorus oxychloride can take place in the presence of the tertiary base such as pyridine.

(2) Only a small excess of phosphorus oxychloride is required.

(3) The reaction can be carried out at a lower temperature than when thionyl chloride is used.

(4) The phosphorus oxychloride is cheaper than the thionyl chloride.

(5) Technical advantages are gained in that the esterification reaction can be carried out without first having to remove the chlorinating agent.

(6) Since the halogenation reaction is run at lower temperatures undesirable side halogenation reactions do not occur.

(7) Since no gases (such as sulfur dioxide when thionyl chloride is used) are emitted during chlorination the working conditions are simplified.

The invention will be more clearly understood from the following examples, which examples are given by way of illustration only and are not to be construed as limiting.

Example 1

100 g. of nicotinic acid is suspended in 265 ml. of distilled and dried pyridine without stirring. 68 g. of phosphorus oxychloride is dripped into the mixture under continued stirring, and at a starting temperature of 20° C. The temperature is allowed to rise to approximately 60° C., which temperature is maintained for a further 60 minutes. Thereafter 24.5 g. of meso-inositol is added successively, and the temperature is controlled so that it does not exceed approximately 80° C. The post-reaction is allowed to take place at this temperature during 2–3 hours, and the reaction mixture is thereafter poured out into 500 ml. of water. The pyridine salts formed during the reaction are immediately easily dissolved, and the meso-inositol hexanicotinate formed is crystallized. The ester is filtered off and washed with water and acetone or alcohol. The meso-inositol hexanicotinate is dried at 100° C. The yield amounts to 90% and the melting point of the product is 258–260° C. and the chlorine content <0.01%.

Example 2

The same procedure as according to Example 1, but 400 ml. of pyridine is added instead of 265 ml. Approximately 60° C. is the highest reaction temperature allowed. The yield amounts to 87% meso-inositol hexanicotinate of a high quality.

Example 3

The same procedure as according to Example 1, but instead of 24.5 g. of meso-inositol, 27 g. of pentaerythritol is added. Before the reaction mixture is poured out in water, 75 ml. of the pyridine is distilled off under reduced pressure. The yield obtained is 80% of pentaerythritol tetranicotinate, with the melting point of 159–

160° C. Through recrystallization from 90% alcohol, the melting point rises to 163–164° C.

Example 4

The same procedure as according to Example 1, but instead of nicotinic acid, 100 g. of isonicotinic acid is added. The yield amounts to 65% of the meso-inositol hexaisonicotinate, and the melting point is 265–266° C. The ester content through saponification is 98.7%. The ester content obtained through perchloric acid titration is 99.5%.

Example 5

The same procedure as according to Example 1, but instead of meso-inositol, 60 g. of n-butylalcohol is added. The reaction product is poured out into 500 ml. of water, and the oil obtained is separated off. After drying with sodium sulphate, the ester, which consists of n-butyl nicotinate with a boiling point of 120–123° C. at 8 mm. Hg. is distilled off in vacuum. The yield amounts to 84%. Boiling point at 8 mm. Hg stated in literature: 121–122° C.

Example 6

The same procedure as according to Example 1, but instead of nicotinic acid, 100 g. of isonicotinic acid is added, and instead of meso-inositol, 60 g. of n-butyl alcohol is added. The processing is the same as according to Example 5. The product obtained consists of n-butyl isonicotinate, and the boiling point is 116–118° C. at 8 mm. Hg. The yield amounts to 83%.

Example 7

The same procedure as according to Example 1, but with the difference that the phosphorus oxychloride is added last. Instead of nicotinic acid, 100 g. of picolinic acid is added, and instead of meso-inositol, 60 g. of n-butyl alcohol is added. The processing is the same as according to Example 5. The product obtained consists of n-butyl picolinate with a boiling point of 130–133° C. at 8 mm. Hg. The yield amounts to 39%. Boiling point at 1 mm. Hg stated in literature: 100° C.

Meso-inositol hexanicotinate obtained by the process of this invention is purer than the meso-inositol hexanicotinate obtained when the chlorinating agent is thionyl chloride as shown by its physical appearance (substantially colorless) and chromatograph obtained with thin layer chromatography.

I claim:
1. A method of preparing a colorless ester of a pyridine carboxylic acid and an alcohol selected from the group consisting of meso-inositol and pentaerythritol which consists of contacting said acid with phosphorus oxychloride in solution in a tertiary amine at approximately 60° C., adding said alcohol to said solution, maintaining the resulting solution at approximately 80° C., and precipitating the corresponding hexa or tetra ester from said solution by the addition of water.
2. A method according to claim 1, wherein the tertiary amine is pyridine.
3. A method according to claim 2, wherein the pyridine carboxylic acid is nicotinic acid.

References Cited

UNITED STATES PATENTS 2,863,873  12/1958  Ekenstam et al. _____ 260—295

OTHER REFERENCES

Badgett et al., J. Am. Chem. Soc., vol. 67, pp. 1135–38 (1945).

Badgett et al., J. Am. Chem. Soc., vol. 69, pp. 2907 (1947).

ALAN L. ROTMAN, Primary Examiner

U.S. Cl. X.R.

260—295, 999